United States Patent [19]

Sakuma et al.

[11] Patent Number: 5,126,944

[45] Date of Patent: Jun. 30, 1992

[54] DATA PROCESSING APPARATUS FOR PRODUCING IN SEQUENCE PULSES HAVING VARIABLE WIDTH AT OUTPUT PORTS

[75] Inventors: Hajime Sakuma; Yukio Maehashi; Kiyoshi Fukushima; Takashi Miyazaki; Hisaharu Oba, all of Tokyo, Japan

[73] Assignee: NEC Corporation, Japan

[21] Appl. No.: 438,750

[22] Filed: Nov. 17, 1989

[30] Foreign Application Priority Data

Nov. 17, 1988 [JP] Japan .................. 63-291308
Nov. 17, 1988 [JP] Japan .................. 63-291309
Nov. 17, 1988 [JP] Japan .................. 63-291310

[51] Int. Cl.⁵ .............................................. F02M 51/00
[52] U.S. Cl. ......................... 364/431.05; 123/480; 395/375
[58] Field of Search ................. 123/480, 416, 494; 364/431.05, 200

[56] References Cited

U.S. PATENT DOCUMENTS

| | | | |
|---|---|---|---|
| 4,383,515 | 5/1983 | Higashiyama et al. | 123/480 X |
| 4,543,934 | 10/1985 | Morita et al. | 123/436 X |
| 4,591,982 | 5/1986 | Buonomo et al. | 364/200 |
| 4,617,899 | 10/1986 | Nakajima | 123/480 X |
| 4,653,015 | 3/1987 | Däumer et al. | 364/431.05 X |
| 4,719,888 | 1/1988 | Kobayashi et al. | 123/494 X |
| 4,848,301 | 7/1989 | Hashimoto et al. | 123/494 |
| 4,924,837 | 5/1990 | Chujo et al. | 123/494 |
| 4,930,068 | 5/1990 | Katayose et al. | 364/200 |
| 4,996,639 | 2/1991 | Ishimoto et al. | 364/200 |
| 5,036,458 | 7/1991 | Matsushima et al. | 364/200 |

Primary Examiner—Parshotam S. Lall
Assistant Examiner—Edward R. Cosimano
Attorney, Agent, or Firm—Ostrolenk, Faber, Gerb & Soffen

[57] ABSTRACT

A CPU includes a program counter, an execution unit, and a program status word register. A pulse producing unit connected to the CPU includes a plurality of output terminals, a port selection register for designating at least one of the output terminals, and a system for generating a pulse start timing signal, a system responsive to the pulse start timing signal for bringing the designated output terminal into one of two bistable logic states. A counter counts a clock pulse signal and brings the selected output terminal into the other of the bistable logic states when the counter indicates a predetermined elapsed time. Another system responsive to the pulse start timing signal sends a signal to the CPU requesting a macro service operation. A system responsive to the request of the macro service operation suspends the program being executed, and a system performs the macro service operation, without saving the contents of the program counter and the program status word register into the data memory and while holding the contenst thereof as they are. The program being executed is resumed after the macro service operation has ben completed. The pulse producing unit may be coupled to a fuel injection device in an engine unit, and may have an input terminal for receiving a pulse request signal from the engine unit.

10 Claims, 10 Drawing Sheets

DATA PROCESSING APPARATUS FOR PRODUCING IN SEQUENCE PULSES HAVING VARIABLE WIDTH AT OUTPUT PORTS

BACKGROUND OF THE INVENTION

The present invention relates to a data processing apparatus and, more particularly, to a microcomputer having a sequential pulse producing function in which pulses are produced in sequence at a plurality of output ports.

Microcomputers have been widely applied to use in various systems as a central processing units. The application field of the microcomputer includes, for example, use as a mechanical control in which the open/close control of a valve, the on/off control of a motor and the like are performed by a pulse produced and outputted from the microcomputer. The pulse width of the pulse corresponds to an open (or close) period of the valve or to an on (or off) period of the motor. The microcomputer monitors the current operating conditions of the equipment having the valve, motor or the like to be controlled, and creates in accordance therewith time data corresponding to the pulse width of the pulse to be produced. When the microcomputer receives a pulse request, it produces a pulse at a predetermined output port connected to the valve, motor or the like during the period corresponding to the time data.

Since the pulse request is generated in asynchronism with the data processing operation of the microcomputer and since the pulse to be produced has a variable pulse width, the microcomputer executes the pulse producing function as an interrupt processing operation. More specifically, when the pulse request is generated, the microcomputer suspends the execution of a main program, saves the current contents of a program counter and a program status word register into a data memory, and thereafter loads the leading address of the interrupt program to the program counter. The interrupt program is thereby initiated. In the execution of the interrupt program, the microprocomputer sets the predetermined output port to produce a pulse thereat and stores a down counter with the time data which has been already created by the main program. The down counter is further supplied with a clock pulse signal and counts down the time data by one each time the clock pulse is supplied thereto. After the execution of the interrupt program, the microcomputer restores the saved contents into the program counter and the program status word register. The suspended main program is thereby resumed. During the execution of the main program, the down counter continues to count down the time data and finally produces a borrow signal which is in turn supplied to the microcomputer as an interrupt request signal. In response to this interrupt request signal, the microprocessor suspends again the execution of the main program, saves the current contents of the program counter and program status word register into the data memory, and thereafter loads the leading address of an interrupt program to execute the same. The port, which has been in a set state, is now reset to stop the pulse generation therefrom. The saved contents are thereafter restored into the program counter and program status word register to restart the suspended main program.

Thus, the conventional microcomputer performs the pulse producing function by the execution of the two interrupt programs. In order to initiate an interrupt program, an overhead for saving the contents of the program counter and the program status word register occurs, as mentioned above. Since the overhead requires a relatively long time period, real-time control of the pulse production is not performed. Moreover, as the frequency of the pulse to be produced increases and/or the number of pulses to be produced at different ports increases, frequent saving and restoring of the contents of the program counter and program status word register are frequently required, so that the execution efficiency of the main program is reduced remarkably.

SUMMARY OF THE INVENTION

Therefore, an object of the present invention is to provide a data processing apparatus performing a sequential pulse producing function in real-time.

Another object of the present invention is to provide a data processing apparatus for producing pulses in sequence at a plurality of output ports without requiring an interrupt program (i.e., of the conventional type which interrupts user's program).

A data processing apparatus according to the present invention comprises a program memory for storing a program to be executed; a data memory for temporarily storing data; a central processing unit interconnected to the program memory and the data memory through a bus and including a program counter for designating an address of the program memory in which an instruction to be executed is stored, an execution unit for executing the instruction from the program memory, and a program status word register for storing an execution condition of the execution unit; and a pulse producing unit interconnected to the central processing unit through the bus and including a plurality of output ports, a port selection register for temporarily storing port selection data for designating at least one of the output ports, means for generating a pulse start timing signal, means responsive to the pulse start timing signal for bringing the output port, which is designated by the port selection data, into one of two bistable states, a counter counting a clock pulse signal, a plurality of compare registers each comparing the count value of the counter with time data temporarily stored therein and bringing the corresponding one of the output ports into the other of the bistable states when the count value reaches the time data, and means responsive to the pulse start timing signal for requesting a macro service operation to the central processing unit; the central processing unit further including means responsive to request of the macro service operation for suspending the program being executed and means for performing the macro service operation without requiring the contents of the program counter and the program status word register to be saved into the data memory and while holding the contents thereof as they are, the macro service operation performing means including means for writing the time data into the compare register which corresponds to the output port designated by the port selection data, means for updating the port selection data to designate another one of the output ports, means for writing the updated port selection data into the port selection register, and means for allowing the program counter and the program status word register to change to resume the suspended program execution.

Thus, the pulse producing unit controls the production and stopping of the pulse at each output port by itself without involving the main program. The writing of the time data into the selected compare register and the updating of the output port from which a pulse is to be outputted, are controlled by the execution unit. However, these control operations are performed without using the program stored in the program memory. No saving and restoring of the contents of the program counter and program status word register is required. Accordingly, the data processing apparatus performs the sequential pulse producing function in a real-time manner and the execution efficiency of the program is not reduced.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE EMBODIMENTS

Figure 1:
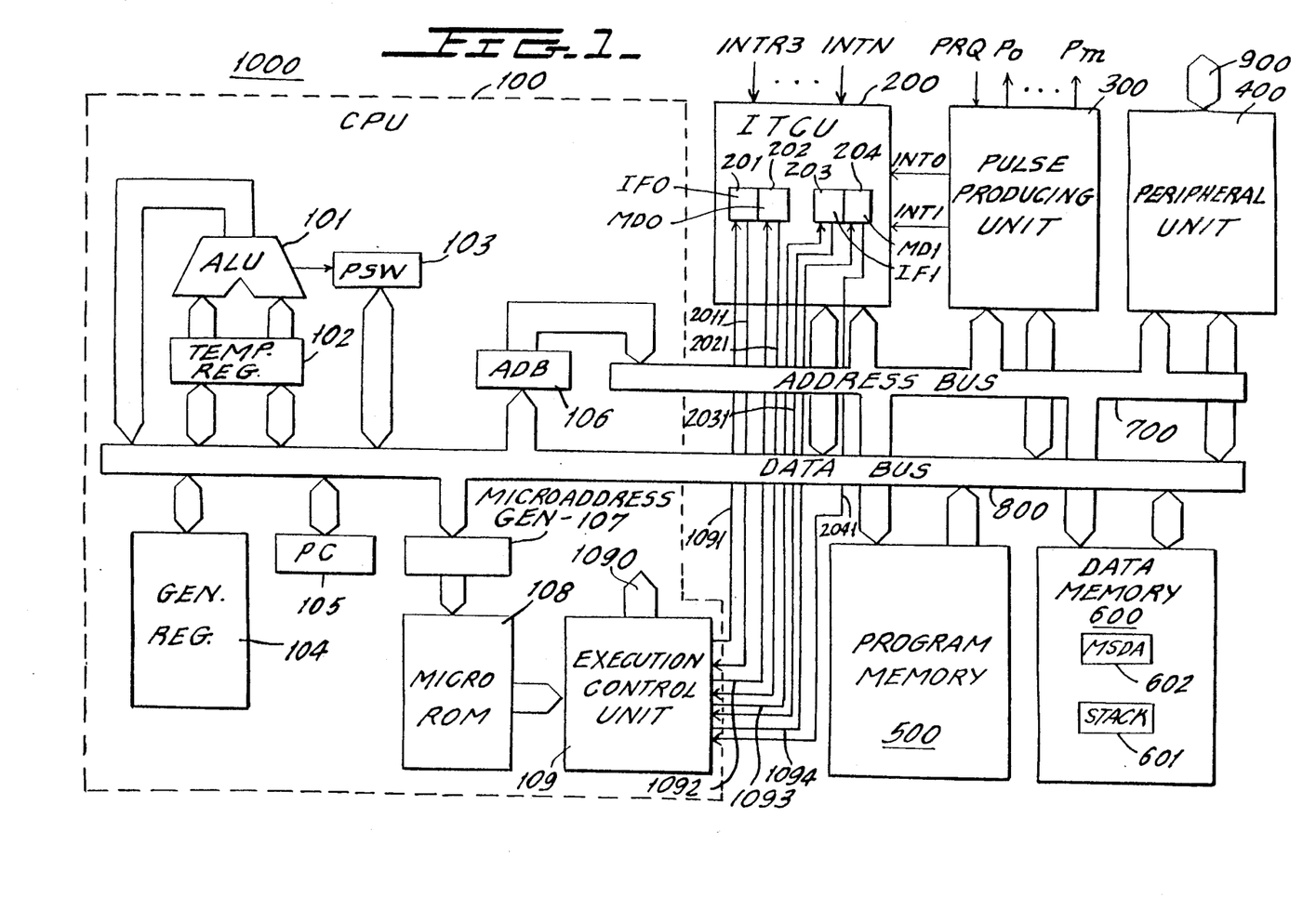
FIG. 1 is a block diagram representative of a first embodiment of the present invention.

Referring to FIG. 1, a data processing apparatus 1000 according to a first embodiment of the present invention includes a CPU (central processing unit) 100, an interrupt control unit (ITCU) 200, a pulse producing unit 300, a peripheral unit 400, a program memory 500 and a data memory 600 which are interconnected via an address bus 700 and a data bus 800.

The CPU 100 includes an arithmetic and logic unit (ALU) 101 for performing arithmetic and/or logic operations on data supplied thereto, a temporary register 102 for temporarily storing data to be supplied to the ALU 101, a program status word register (PSW) 103 for temporarily storing an execution condition of the CPU 100, a set of general purpose registers 104, a program counter (PC) 105 for designating an address of the program memory 500 in which an instruction to be executed is stored, an address buffer (ADB) 106 for driving the address bus 700 to transfer address information thereon in response to the address data supplied thereto, a microaddress generator 107 for fetching data on the data bus 800 as an instruction supplied from the program memory and generating a microaddress, a micro ROM (microprogram read only memory) 108 for storing plural sets of microprograms and accessed by the microaddress generator 107, and an execution control unit 109 for decoding a microinstruction from the micro ROM 108 and generating various control signals and data 1090 to control the execution of the program. The micro ROM 108 stores a string of microprograms for executing a macro service operation which will be described in detail later.

The ITCU 200 receives first and second interrupt request signals INT0 and INT1 from the pulse producing unit 300 and further receives other interrupt request signals INT3 to INTN from units or equipment to be controlled (not shown). When the ITCU 200 is supplied simultaneously with a plurality of interrupt request signals INT, it selects, in accordance with the predetermined priority order, one of them which has the highest priority order. With respect to each of the interrupt request signals INT0 to INTN, an interrupt request flag (IF) and a mode designation flag (MD) are provided. In the drawing, there are shown only two pairs of flags 201 (IF0), 202 (MD0), 203 (IF1) and 204 (MD1) corresponding to the first and second interrupt request signals INT0 and INT1. When a certain interrupt request signal INT is accepted, the corresponding interrupt request flag IF is set to inform the CPU 100 via a corresponding signal line (2011 or 2031). In the CPU 100, the execution control unit 109 samples the levels of the interrupt request flag lines 2011, 2031 and so forth at the end of execution of each instruction from the program memory 500 to detect the occurrence of an interrupt request. When the interrupt request is detected to occur, the unit 109 then detects the contents of the corresponding mode designation flag MD via a corresponding mode flag lines 2021, 2041 or the like. The content of the mode designation flag MD designates the CPU 100 to execute the interrupt processing operation by either a vector interruption operation mode or a macro service operation mode.

The vector interrupt operation mode is well known in the art. In this mode, the contents of the PC 105, PSW 103 and general register 104 are saved in a stack area 601 of the data memory 600 and the leading address of the corresponding interrupt program routine, which is preliminarily stored in a corresponding location of vector table, is thereafter loaded into the PC 105. The interrupt program routine is thereby initiated. This program is stored in the program memory 500 and thus created by a user of this apparatus 1000.

On the other hand, the macro service operation mode is provided in accordance with the feature of the present invention. In this mode, the contents of the PC 105, PSW 103 and general register 104 are not saved into the stack area 601, but held therein as they are until the macro service operation is completed. A program for the macro service operation is stored in the micro ROM 108 as a string of microinstructions and is thus created by a manufacturing maker of the CPU 100 and is not changed by the user. The initiation information for the macro service operation is stored in a macro service data area 602 which is allocated to particular address locations of the data memory 600.

Figure 4:
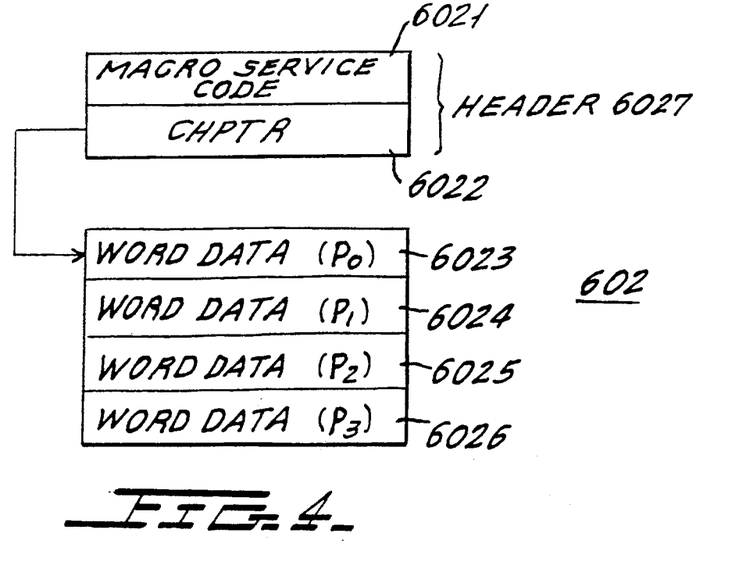
FIG. 4 is a diagram representative of a construction of a macro service data area (MSDA) shown in FIG. 1.

Referring to FIG. 4, the macro service data area 602 includes a macro service code location 6021 storing code data for designating a macro service to be executed, a plurality of word data locations (four locations 6023 to 6026 being shown in the drawing) temporarily each storing data to be used in the macro service operation, the addresses of the word data locations being successive, and a channel pointer (CHPTR) storing address information for pointing out the leading address of the successive addresses of the work data locations. The macro service code location 6021 and CHPTR 6022 are treated as one set, as shown by "HEADER" 6027 in FIG. 4.

Turning back to FIG. 1, when the mode designation flag MD designates the macro service operation, the execution control unit 109 accesses the data memory 600 by use of the address buffer 106 and the address bus 700 to load the header portion 6021 and 6022 to the micro-address generator 107. As a result, the macro service designated by the macro service code information is initiated. In the present embodiment, logic "0" of the mode flag MD designates the vector interruption operation and logic "1" thereof designates the macro service operation. The execution control unit 109 can reset a selected one of the flags 201 to 204 by the corresponding one of clear signal lines 1091 to 1094.

The peripheral unit 400 includes a plurality of input/output ports, an A/D converter unit, a serial data interface unit, etc., as well known in the art, which communicate with external devices via I/O bus 900. The program memory 500 stores a main program and one or more interrupt programs. The data memory 600 temporarily stores data to be processed and processing resultant data and includes the stack area 601 and the macro service data area 602 mentioned hereinbefore.

Figure 2:
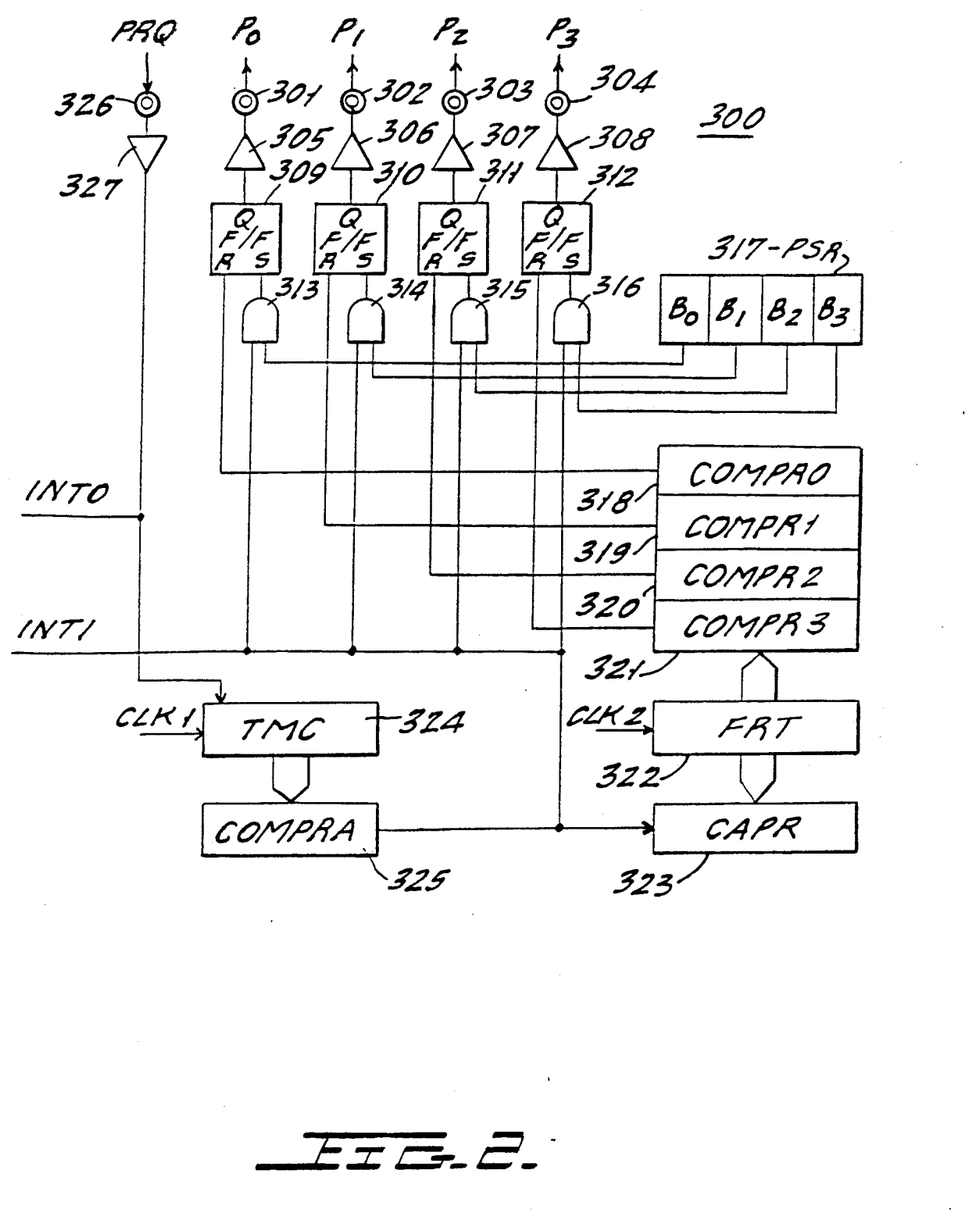
FIG. 2 is a block diagram representative of a pulse producing unit shown in FIG. 1.

The pulse producing unit 300 receives a pulse request signal PRQ from an external device or equipment to be controlled. This signal PRQ is used as an initiation signal of a pulse producing operation. The unit 300 produces pulses $P_o$ to $P_m$ in sequence each time the signal PRQ is applied thereto. The detailed construction of the unit 300 is shown in FIG. 2. In should be noted that only four pulse ports are shown in the drawings. The signal PRQ is applied via an input terminal 326 to an input buffer 327. The output of the input buffer is supplied to the ITCU 200 as the first interrupt request signal INT0 and further to a timer counter (TMC) 324 as a reset pulse. The TMC 324 is reset by the signal PRQ, and after the signal PRQ disappears, it starts to count a first clock pulse signal CLK1 applied thereto. The count value of TMC 324 is supplied to a compare register (COMPRA) 325 which is turn compares the count values of TMC 324 with data stored therein. COMPRA 325 produces an output when the count value of TMC 324 is coincident with the data stored in COMPRA 325. The coincidence-indicating output of COMPRA 325 is supplied to ITCU 200 as the second interrupt request signal INT1 and further to one input node of AND gates 313 to 316 in common. The other input nodes of AND gates 313 to 316 are supplied with bit data $B_0$ to $B_3$ of a port selection register (PSR) 317, respectively. The outputs of AND gates 313 to 316 are supplied to set terminals S of flip-flop (F/F) circuits 309 to 312, respectively. Accordingly, the F/F circuit, which is brought into the set state in response to the coincident output from COMPRA 325, is selected by the bit data $B_0$ to $B_3$ stored in PSR 317. The outputs of F/F circuits 309 to 312 are supplied via output buffers 305 to 308 to output terminals 301 to 304, respectively, from which the pulses $P_0$ to $P_3$ are outputted. The set state of the F/F circuit presents a leading edge of the corresponding one of the pulses $P_0$ to $P_3$. Moreover, the time interval between the application timing of the signal PRQ and the leading edge of the produced pulse P is controlled by the data stored in COMPRA 325. That is, the coincident output from COMPRA 325 functions as a pulse producing start timing signal which is controlled by data to be stored into COMPRA 325. The coincident output from COMPRA 325 is further applied to a capture register (CAPR) 323. In response thereto, CAPR 323 latches the count value of a free-running timer counter (FRT) 322 counting a second clock pulse signal CLK2 applied thereto. The count value of FRT 322 is further supplied in common to four compare registers (COMPR0 to COMPR3) 318 to 321. Each of COMPR0 to COMPR3 318 to 321 compares the count value of FRT with data stored therein and produces a coincident output when both of them are coincident with each other. The coincidence-indicating outputs of COMPR0 to COMPR3 318 to 321 are supplied to reset terminals R of F/F circuits 309 to 312, respectively. Thus, the coincident output of each of COMPR0 to COMPR3 presents trailing edge of the corresponding one of the pulses $P_0$ to $P_3$. Accordingly, the time interval between the leading and trailing edges, i.e. the pulse width, of each of the pulses $P_0$ to $P_3$ is controlled by the data to be stored into each of COMPR0 to COMPR3 318 to 321. The CPU 100 stores desired data into COMPRA and COMPR0 to COMPR3 by use of the address and data buses 700 and 800. Each of the compare registers 318 to 321 and 325 are constructed by a content addressable memory (CAM) in the present embodiment.

Figure 3:
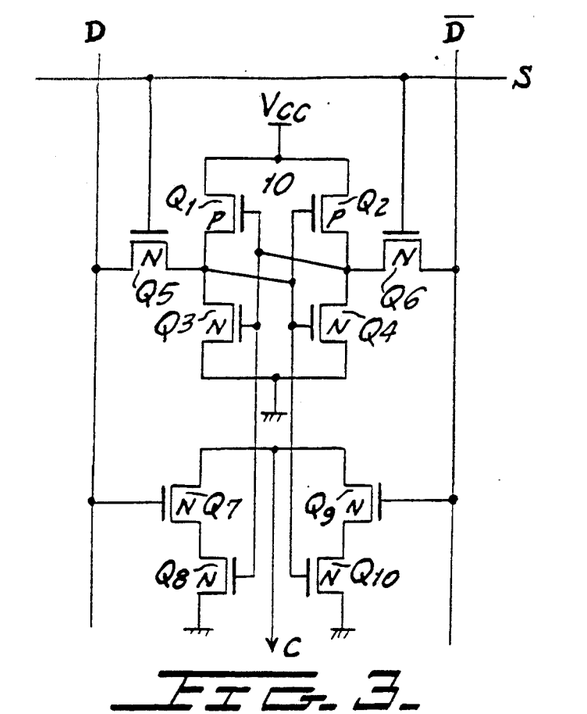
FIG. 3 is a circuit diagram representative of one bit construction of a content addressable memory employed as each of compare registers shown in FIG. 2.

Referring to FIG. 3, there is shown the construction of one bit of a CAM, in which two p-channel MOS transistors $Q_1$ and $Q_2$ and two N-channel MOS transistors $Q_3$ to $Q_4$ forms a flip-flop 10. Two N-channel transfer gate transistors $Q_5$ and $Q_6$ are connected respectively between the flip-flop 10 and true and complementary data lines D and $\overline{D}$. The true and complementary data stored in the flip-flop 10 are supplied respectively to gates of N-channel MOS transistors $Q_7$ and $Q_9$ which are connected in series to N-channel MOS transistors $Q_8$ and $Q_{10}$ between a coincident output line C and ground. When a selection line S takes an active level, the transistors $Q_5$ and $Q_6$ are turned ON to connect the flip-flop 10 to data lines D and $\overline{D}$. In a data write operation, true and complementary data to be written are supplied to the lines D and $\overline{D}$ and then written into the flip-flop. In a data read operation, the true and complementary data stored in the flip-flop 10 are transferred onto the lines D and $\overline{D}$, respectively. In a comparison operation, the transistors $Q_5$ and $Q_6$ are turned OFF, and true and complementary data of one bit of the count value from TMC 324 or FRT 322 are supplied to lines D and $\overline{D}$, respectively. Accordingly, when the data on the line D ($\overline{D}$) is coincident with the data stored in the flip-flop 10, the transistors $Q_8$ to $Q_{10}$ are turn OFF to produce the coincident output. If desired, each of comparator registers 318 to 321 and 325 may be constituted of a register and a comparator such as an exclusive OR or NOR gate.

Next, an operation of the data processing apparatus 1000 will be described below in a case where the mode flags 202 and 204 (MD0 and MD1) are reset to logic 0 and set to logic 1, respectively.

The content of PC 105 is transferred onto the address bus 700 via ADB 106 to access the program memory 500. The instruction stored in the accessed address of the memory 500 is thereby read out therefrom onto the data bus 800 and then fetched into the microaddress generator 107. The content of PC 105 is thereafter updated. The generator 107 initiates a string of microprograms for the fetched instruction, which microprograms are then supplied to the execution control unit 109. The unit 109 generates necessitated control signals or data 1090 for controlling ALU 101, general register 104, ADB 106, peripheral unit 400 and/or data memory 600. The fetched instruction is thus executed by CPU 100. At the end of the execution of the fetched instruction, the execution control unit 109 samples the levels of the interrupt request flag lines 2011, 2021 and so forth. When all the lines 2011, 2021 and so forth are logic 0, the updated content of PC 105 is transferred onto the address bus 700 to fetch a next instruction from the program memory 500.

When the external device (not shown) to be coupled to the pulse producing unit 300 generates the pulse request signal PRQ, TMC 324 is reset the first interrupt request signal INT0 is supplied to ITCU 200. In response to this signal INT0, ITCU 200 sets the corresponding flag IF0 201. The interrupt request flag line 2011 is thereby changed to logic 1. Thus logic level is sampled by the unit 109 at the end of the execution of the current instruction. The unit 109 further detects the level at the mode designation line 2021. MD0 202 is reset to logic 0 to designate the vector interrupt operation. Therefore, the unit 109 saves the current contents of PC 105 and PSW 103 to the stack area 601 of the data memory 600 and then loads the leading address of an interrupt program to PC 105. The interrupt program routine is thereby in initiated from the program memory 500. In this program routine, CPU 100 writes COMPRA 325 with data for controlling the pulse producing start timing, which has been already prepared in the main program routine and stored a predetermined address of the data memory. If desired, that data may be produced in the interrupt program routine. After the interrupt program is completed, the unit 109 reset IF0 201 by the clear signal 1091 and restores the saved contents to PC 105 and PSW 103, respectively. The suspended program is thereby resumed being executed.

On the other hand, TMC 324 is counting the clock pulse signal CLK1 which is supplied from the CPU 100 or the external device to be controlled as an event clock pulse signal. When the count value of TMC 324 becomes equal to the data stored in COMPRA 325, COMPRA 325 produces the coincident output as a pulse producing start timing signal. The port selection registers (PSR) 317 is initially set with data of "1000" (i.e. $B_0$, $B_1$, $B_2$, $B_3$ = 1, 0, 0, 0). Accordingly, F/F circuit 309 is set, so that the output terminal 301 is raised up to the high level to present the leading edge to the pulse signal $P_0$. CAPR 323 fetches the count value of FRT 322 of the time when COMPRA 325 produces the coincident output. The clock signal CLK2 may be supplied from CPI 100 or the external. The coincident output of COMPRA 325 is further supplied to ITCU 200 as the second interrupt request signal, so that IF1 203 is set to logic 1.

Figure 5:
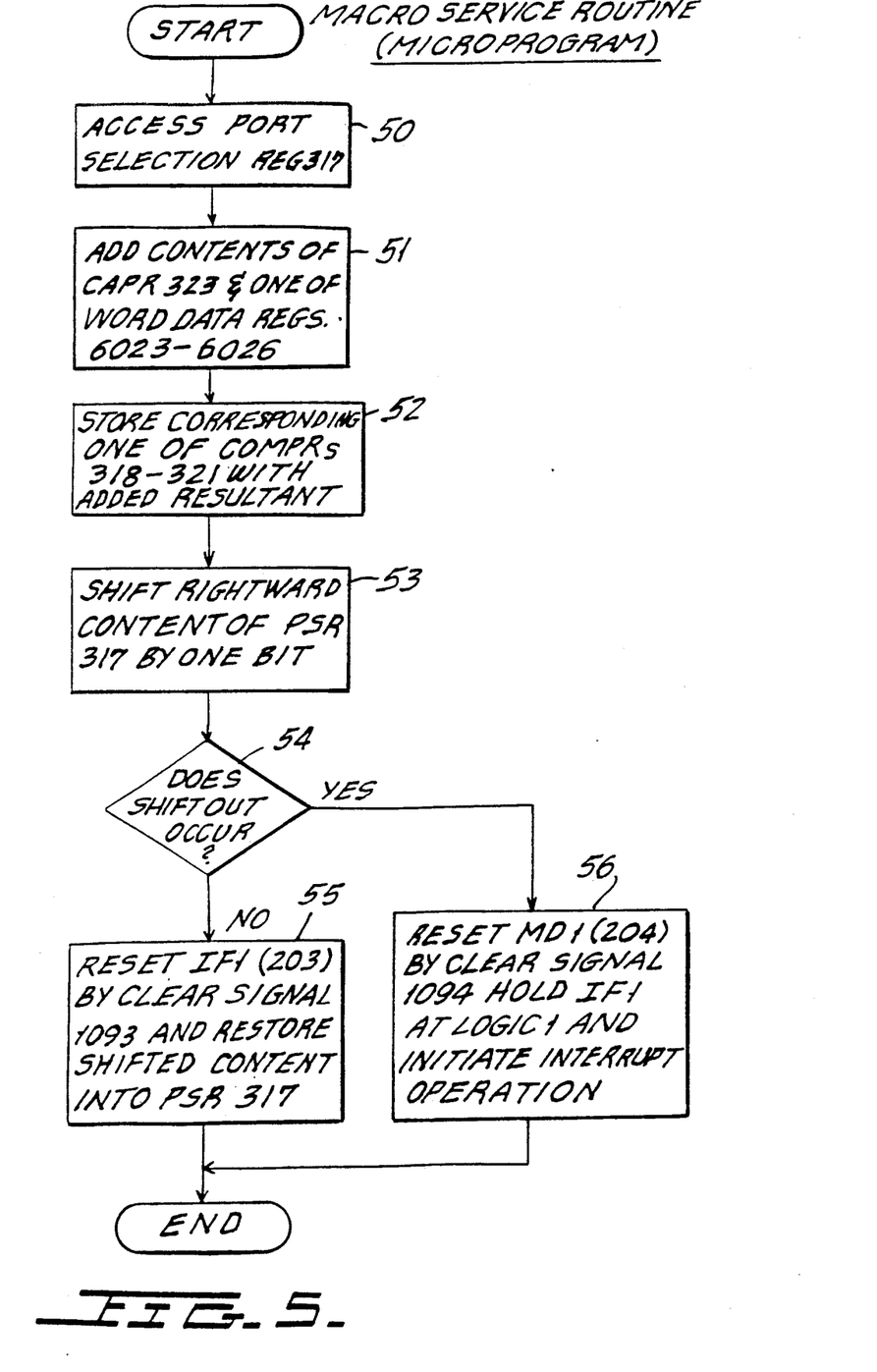
FIG. 5 is a flow chart representative of a macro service operation.

At the end of execution of the current instruction, the execution control unig 109 detects IF1 203 having been set by sampling the level of the line 2031, and then senses the state of MD1 204 through the line 2041. The MD1 204 is set to logic 1 to designate the macro service mode operation. Consequently, the unit 109 suspends the execution of program stored in the memory 500 and initiates the macro service operation with PC 105 and PSW 103 being made to hold their current contents as they are. In the macto service operation, the execution control unit 109 first accesses the data memory 600 to read the content of the header portion 6027 consisting of macro service code location 6021 and CHPTR 6022. Since the header portion 6027 has a particular address, the unit 109 supplies this address to ADB 106. The header portion 6027 is fetched in the microaddress generator 107 which is turn generates the leading microaddress for the macro service microprogram to be executed in response to the macro service code stored in the fetched memory location 6021. Thus, the macro service microprogram, a flow chart of which is shown in FIG. 5, is read out from the micro ROM 108 and then supplied to the unit 109.

In this microprogram, the unit 109 first accesses PSR 317 to read out the content thereof (step 50). Since PSR 317 has a certain address, this address is supplied to ADB 106 from the unit 109. The content of PSR 317 is checked to detect which bit thereof stores logic 1. In this case, since the 0-th bit $B_0$ stores logic 1, the detected bit position is 0. The unit 109 then commands ALU 101 to add the content of CHPTR 6022 and the detected bit position (i.e., 0). The output of ALU 101 is transferred to ADB 106, so that the word data memory location 6023 is accessed. The word data memory locations 6023 to 6026 are allocated to store pulse width data corresponding to the pulse widths of the pulses $P_0$ to $P_3$, respectively, and the respective pulse width data for pulses $P_0$ to $P_3$ have been already calculated and stored in the memory locations 6023 to 6026 during execution of program stored in the memory 500. The pulse width data stored in memory location 6023 is thereby read out from the data memory 600 and then transferred to the temporary register 102. The unit 109 accesses CAPR 323 by a certain access thereof to transfer the content thereof to the temporary registers 102, and then supplies an adding operation command to ALU 101. Therefore, the content of CAPR 323 and the pulse width data of memory location 6023 are added with each other (step 51). The unit 109 accesses COMPRO 318 by a certain address thereof to write the added resultant data into COMPRO 318 (step 52). Thereafter, the unit 109 commands ALU 101 to shift rightward the content of PSR 317 by one bit (step 53), and then detects whether or not a shift-out occurs (step 54). In this case, since the shifted content of PSR 317 is "0100", the shift-out does not occur, so the procedure advances to step 55, wherein the unit 109 resets IF1 203 to logic 0 through the clear signal 1093. The shifted content is restored into PSR 317. Thus, the macro service operation is completed. Thereafter, the unit 109 allows PC 105 and PSW 103 to change the contents thereof, so that the suspended program execution is restarted.

When the count value of FRT 322 reaches the data stored in COMPRO 318, the coincident output is produced from COMPRO 318, so that F/F circuit 309 is reset. The pulse $P_0$ is thereby changed to the low level.

After or before the pulse $P_0$ is changed to the low level, when the signal PRQ is supplied to the terminal 326, the above-mentioned vector interrupt operation is initiated, so that new data, which controls the occurrence timing of the leading edge of the pulse P, is stored into COMPRA 325.

When the count value of TMC 324 becomes equal to that new data, COMPRA 325 produces the coincident output. Since the PSR stores the data of "0100", F/F circuit 310 is set to change the pulse $P_1$ to the high level. The above-mentioned marco service operation is again initated, so that the pulse width data, which determines the pulse width of the pulse $P_1$, is stored in COMPR1. The content of PSK 317 is updated to "0010". When the count value of FRT is coincident to the data of COMPR1, the pulse $P_1$ is changed to the low level. Thus, the pulses $P_1$ to $P_3$ are produced in sequence each time the pulse request signal PRQ is supplied to the unit 300. The leading edge of each of pulses $P_0$ to $P_3$ are controlled by data to be stored into COMPRA 325 and the pulse widths thereof are controlled by data to be stored into COMPR0 318 to COMPR3 321, respectively. Moreover, the pulse producing unit 300 performs the production and stop of each pulse P by itself without any program, and storing of pulse width data into the respective compare registers 318 to 321 and updating of the content of PSR 317 are performed by the macro service operation without saving and restoring the contents of PC 105 and PSW 103. Therefore, the sequential pulse producing operation is performed in a real-time and with a variable pulse start timing and pulse width.

In the macro service operation for storing the pulse width data into COMPR3 321, the procedure advances to step 56, wherein the shift-out occurs in the step 54. Consequently, the unit 109 resets MD1 204 to logic 0 by the clear signal 1094. At this time, IF1 203 is held at logic 1. Accordingly, a vector interrupt operation is initiated. In this operation, the contents of PC 105 and PSW 103 are saved to the stack area 601, and PSR 317 is initialized to "1000" by the execution of program stored in the memory 500. IF1 203 and MD1 204 are thereafter reset to logic 0 and set to logic 1, respectively. Thus, the vector interrupt operation is completed. The saved contents are restored respectively to PC 105 and PSW 103 to resume the suspended program.

In the above embodiment, the operation for storing data to COMPRA 325 can be performed as the macro service operation by setting MD0 202 to logic 1. FRT 322 may be reset by the coincident output of COMPRA 325, and in that case CAPR 323 may be omitted.

Since the data processing apparatus 1000 described above performs a real-time sequential pulse producing operation, it is applicable to an electronic fuel injection system for an engine unit that requires a precise pulse control.

Figure 6:
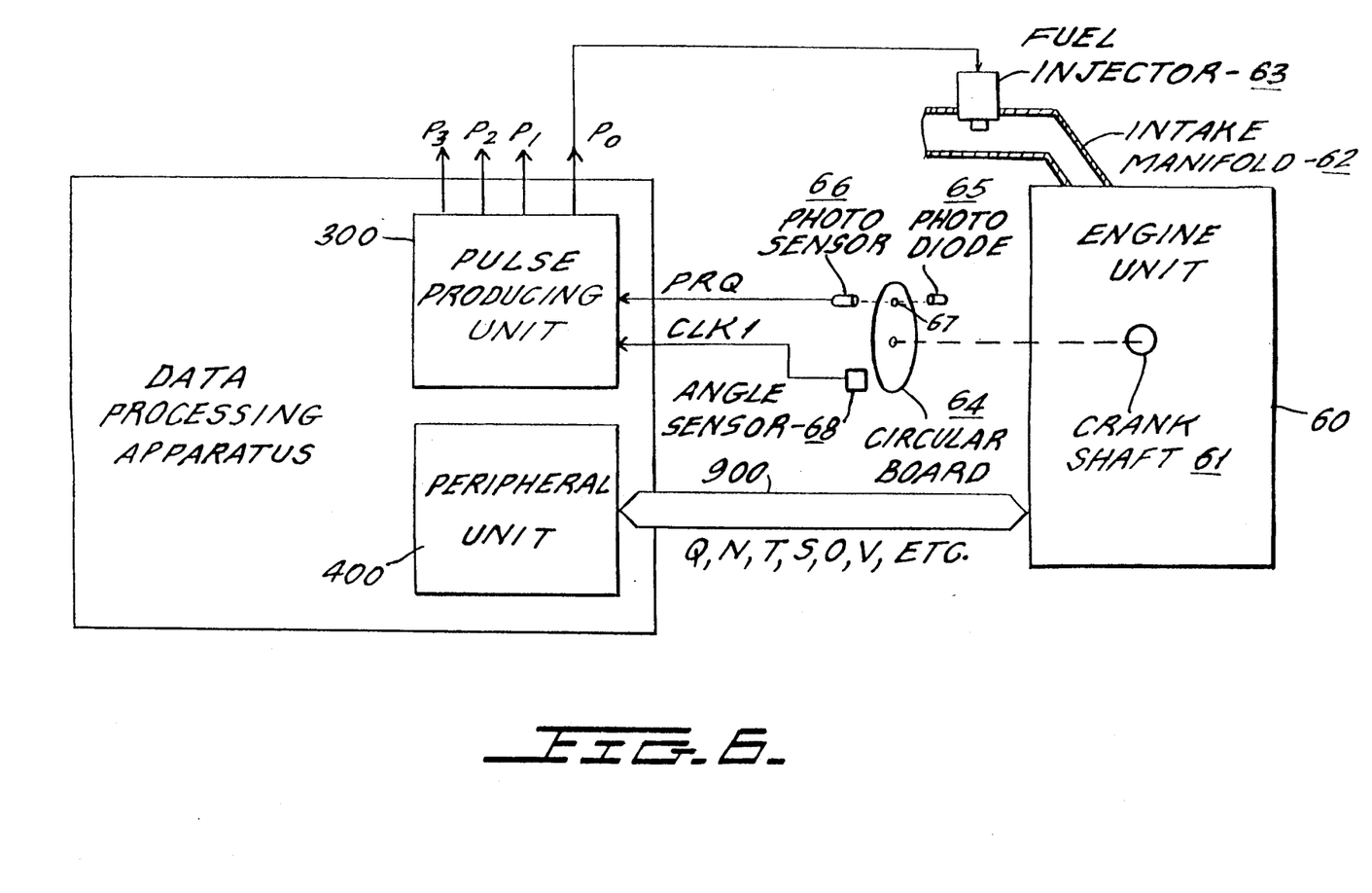
FIG. 6 is an application diagram of a system in which the data processing apparatus shown in FIG. 1 is applied to an electronic fuel injection equipment of an engine unit.

Such an application block diagram is shown in FIG. 6. An engine unit 60 is of a four-cylinder type and an intake manifold 62 for each cylinder is intalled with a fuel injector 63. The injector 63 injects fuel into the intake manifold 62 during the high level period of a pulse applied thereto. That is, the high level period of the pulse controls an amount of fuel to be injected. Each of the pulses $P_0$ to $P_3$ produced in sequence by the data processing apparatus 1000 is supplied to the corresponding fuel injector 63. A crank shaft 61 of the engine unit 60 has a circular board 64 in which a hole 67 is provided. A photo diode 65 and a photo senser 66 are provided with a coaxial relationship, and the board 64 intervenes therebetween. Accordingly, when the hole 67 exists on the axis between the diode 65 and senser 66, the light from the diode 65 reaches the senser 66, so that a pulse signal is generated from the senser 66. This pulse is supplied to the pulse producing unit 300 (the terminal 326) as the pulse request signal 327. The hole 67 is provided in the board 64 so as to pass the axis between the diode 65 and the senser 66 at the biginning of the aspiration cycle of each cylinder. Therefore, the data processing apparatus 1000 receives the signal PRQ from the photo senser 66 each time the aspiration cycle starts in the respective cylinders. Further provided is an angle senser 68 which produces one pulse each time the rotation angle of the board 64 changes by a predetermined angle, 1° for example. This pulse train is supplied to TMC 324 of the unit 300 as the first clock signal CLK1. The engine unit 60 is further coupled via the I/O bus 900 to the peripheral unit 400 of the data processing apparatus 1000 to supply various information representative of the current operating conditions thereof such as aspiration air amount (Q), engine rotation number (N), cooling water temperature (T), throttle valve open degree (S), oxygen concentration (O) in an exhaust manifold, battery power voltage (V), etc.

As described hereinbefore, the data to be stored in COMPRA 325 determines the leading edge of each of pulses $P_0$ to $P_3$ and thus determines a fuel injection start timing (I). The data to be stored in COMPR0 318 to COMPR3 321 determines the pulse width of the respective pulses $P_0$ to $P_3$ and thus determines a fuel injection amount (IW). The CPU 100 calculates the fuel injection start timing data I and the fuel injection amount data (IW) by executing the main program stored in the memory 500 in accordance with a flow chart shown in FIG. 7.

Figure 7:
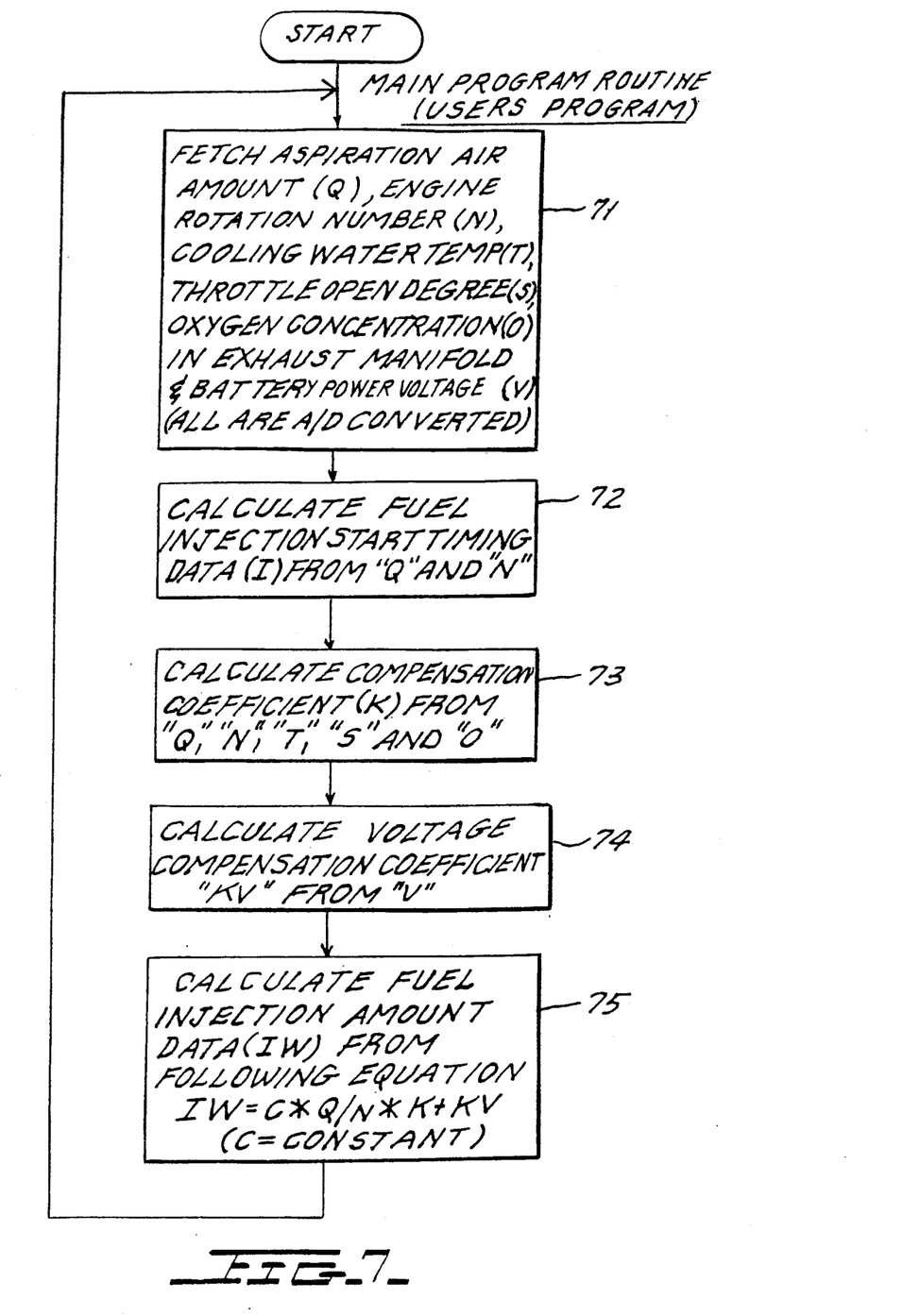
FIG. 7 is a flow chart representative of a part of a main program routine executed by the data processing apparatus in the system shown in FIG. 6.

More specifically, the CPU 100 fetches all control parameters Q, N, T, S, O and V through the peripheral unit 400 (step 71). These parameters are converted into digital data in the unit 400. Based upon the data Q and N, the fuel injection start timing data I is calculated and temporarily stored in a certain address of the data memory 600 (step 72). For preparation for obtaining the data IW, a compensation coefficient K and a voltage compensation coefficient KV are calculated based upon the parameters Q, N, T, S, O and V (steps 73 and 74). The fuel injection amount data IW is thus calculated (step 75) and stored in another certain address of the data memory 600. These steps 71 to 75 are repeated because the operating conditions of the engine unit 60 always changes.

Figure 8:
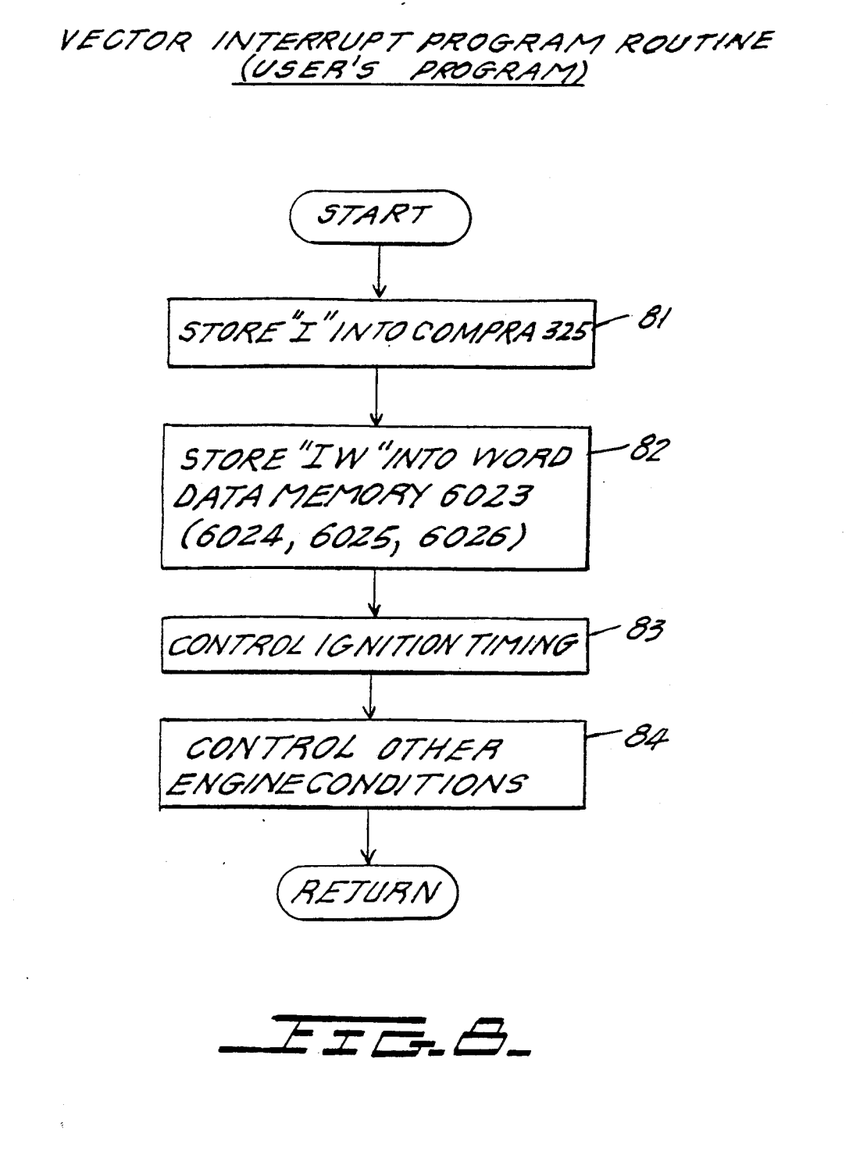
FIG. 8 is a flow chart representative of a vector interrupt program routine executed by the data processing apparatus in the system shown in FIG. 6.
Figure 9A:
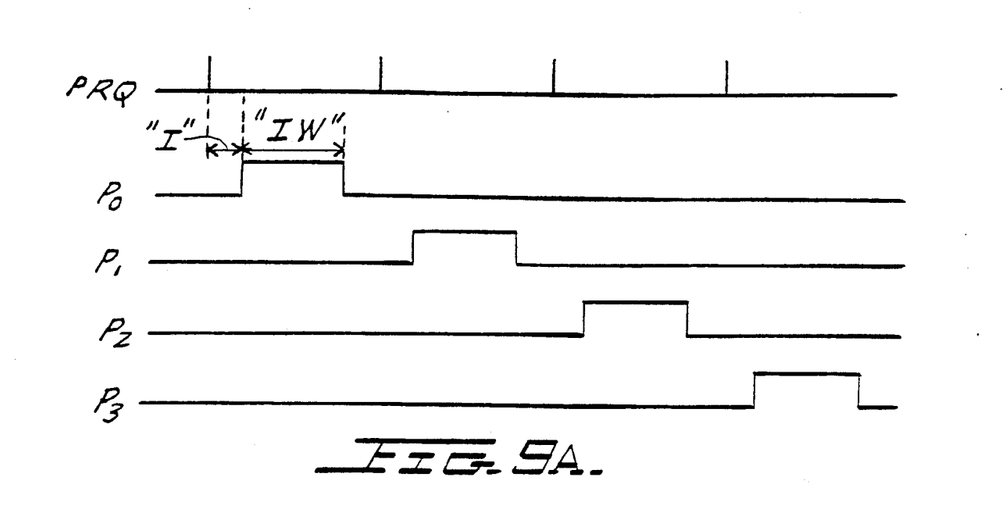
FIGS. 9A and 9B are timing charts representative of a relationship between a pulse request signal PRQ and each of pulses produced at output ports $P_0$ to $P_3$.

When the pulse request signal PRQ is generated from the photo senser 66, as shown in FIG. 9A, IF0 201 in ITCU 200 is set to logic 1. MD0 202 and MD1 204 are initially set to logic 0 and logic 1, respectively. Therefore, a vector interrupt program routine, a flow chart of which is shown in FIG. 8, is initiated. In this routine, the fuel injection starting timing data I is read out from the data memory 601 and then stored in COMPRA 325 (step 81). The fuel injection amount data IW are also read out from the data memory 601 and then stored in the word data locations 6023 to 6026, respectively (step 82). In this routine, the control of an ignition timing (step 83) and other engine conditions (step 84) is further performed via the peripheral unit 400 and the I/O bus 400. The interrupt program routine is thus completed and the suspended main program execution is resumed.

Figure 9B:
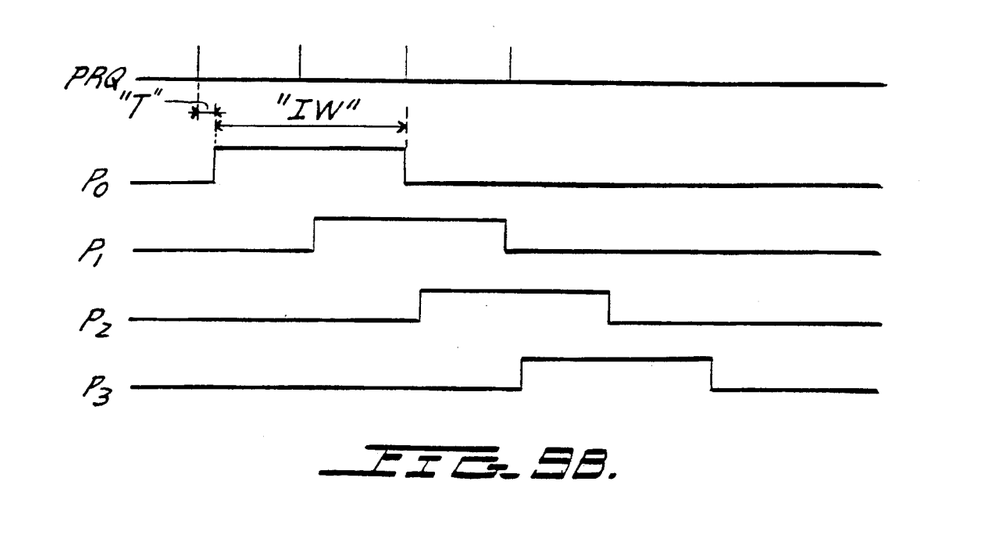

When the count value of TMC 324 reaches the content of COMPRA 325, the pulse $P_0$ is changed to the high level, as shown in FIG. 9A. Further, the second interrupt request INT1 is generated, so that the above-mentioned macro service operation is initiated. The fuel injection amount data IW is thereby stored from the data word location 6023 into COMPR0 318 and the content of PSR 317 is updated to "0100". When the count value of FRT 322 reaches the data of COMPR0 318, the pulse $P_0$ is changed to the low level by the coincident output from COMPRO 318, as shown in FIG. 9A. Thus, the fuel injection control pulses $P_0$ to $P_4$ are produced in sequence each time the pulse request signal PRQ is generated, as shown in FIG. 9A. Since the storing of the fuel injection amount data IW into the corresponding one of COMPRO to COMPR3 and the updating of the content of PSR 317 are performed by the macro service operation, even when the pulse request signal PRQ is generated in a very short cycle in accordance with a rapid acceleration of the engine rotation speed, the precise control is attained to each of pulses $P_0$ to $P_3$, as shown in FIG. 9B.

Figure 10:
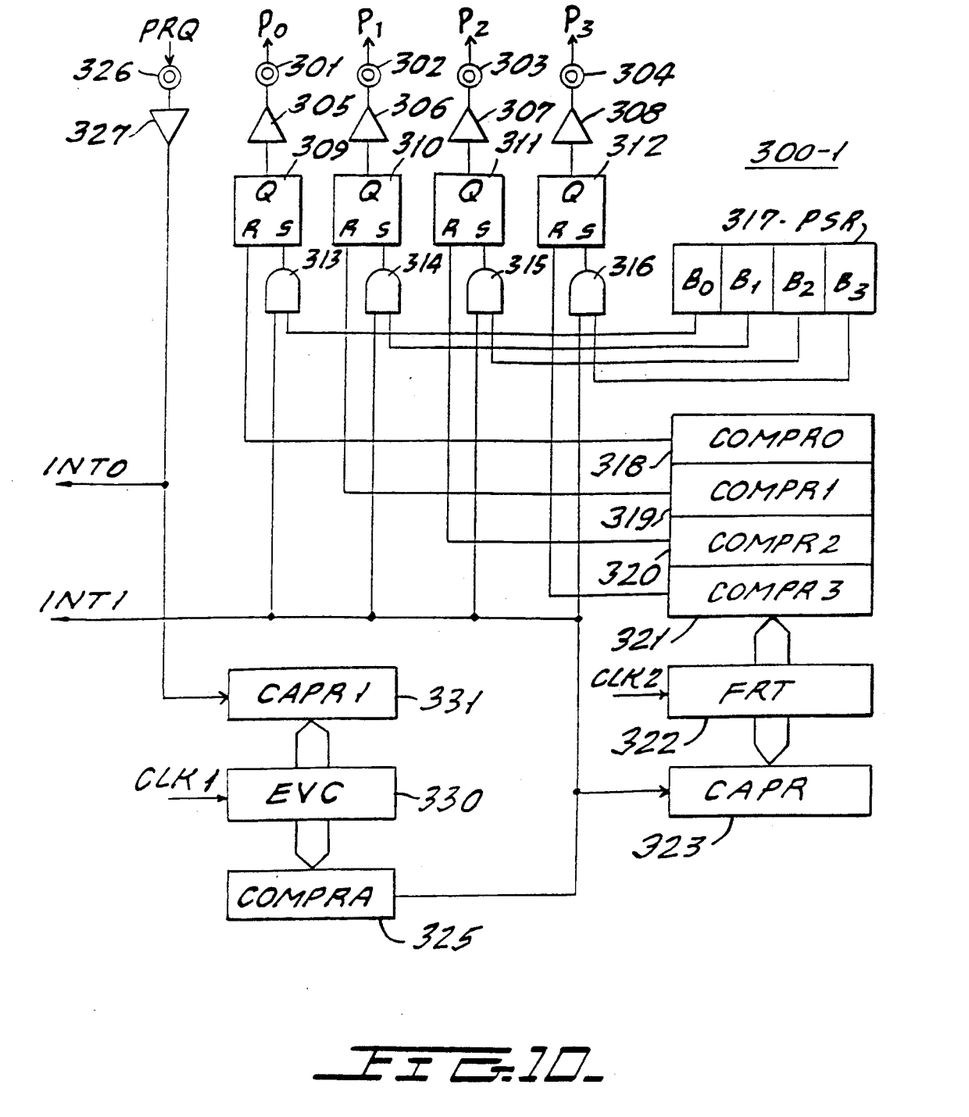
FIG. 10 is a block diagram representative of a pulse producing unit according to a second embodiment of the present invention.

Referring to FIG. 10, there is shown a pulse producing unit 300-1 according to a second embodiment of the present invention, in which the same constituents as those shown in FIG. 2 are denoted by the same reference numerals to omit further description thereof. In this embodiment, an event counter (EVC) 330 and a capture register (CAPR1) 331 are employed in place of TMC 324 shown in FIG. 2. EVC 330 is not reset by the signal PRQ and continues to count the first clock signal CLK1. When the signal PRQ is generated, CAPR1 331 fetches the count value of EVC 330. Accordingly, the data to be stored in COMPRA 325 is the sum of the content of CAPR1 331 and the pulse start timing data.

Figure 11:
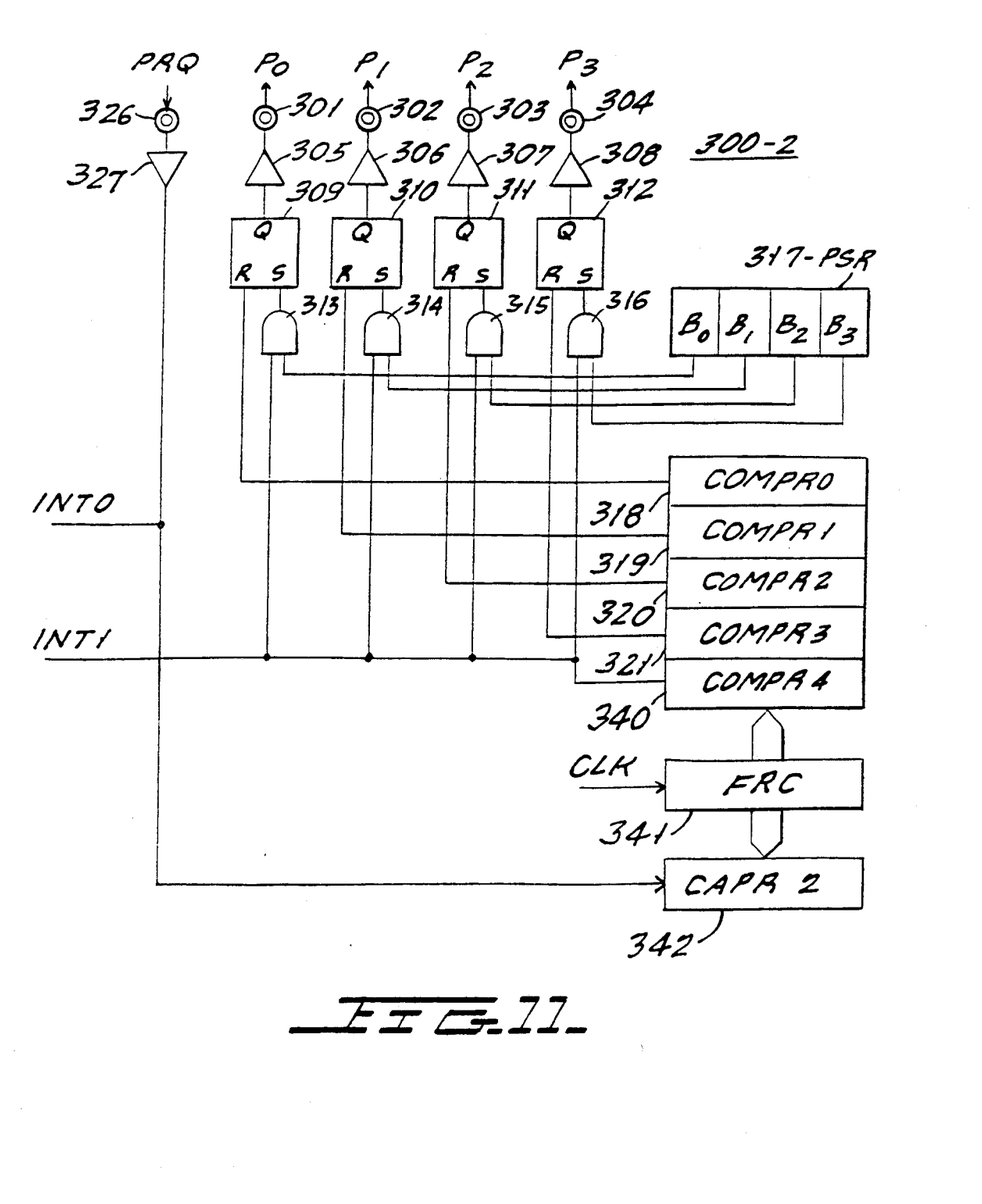
FIG. 11 is a block diagram representative of a pulse producing unit according to a third embodiment of the present invention.

While two clock pulse signals CLK1 and CLK2 are employed in the above embodiments, only one clock signal may be employed. The circuit construction in that case is show in FIG. 11 as a third embodiment, wherein the same constituents as those shown in FIGS. 2 and 10 are also denoted by the same reference numerals. In this embodiment, a free-running counter 341 is provided, which is supplied with a clock pulse CLK and continues to count it. The count value thereof is supplied in common to a compare register (COMPR4) 340 and a capture register (CAPR2) 342. When the pulse request signal PRQ is supplied to a unit 300-2, CAPR2 342 fetches the count value of FRC 341. The content of CAPR2 342 is added to pulse start timing control data, and this resultant data is then stored to COMPR4 340. When the count value of FRC 341 reaches to the content of COMPR4 340, the coincident output is produced from COMPR4 340, so that the leading edge is presented to the pulse port selected by the content of PSR 317 and the second interrupt request signal INT1 is generated. The above-mentioned macro service operation is thereby initiated. However, in the step 51 shown in FIG. 5, added to the data stored in the corresponding one of the word data registers 6023 to 6026 is the content of COMPR4 340. That is, COMPR4 340 performs both functions of COMPRA 325 and CAPR 323. In the application to the fuel injection system shown in FIG. 6, the output of the photo sensor 66 is applied to the terminal 326 as the signal PRQ, and the clock signal CLK applied to FRC 341 is either the pulse train derived from the senser 68 or a reference clock derived from the CPU 100.

It is apparent that the present invention is not limited to above embodiments, but may be modified and changed without departing from the scope and spirit of the invention. For example, two or more pulses can be produced simultaneously by setting two or more bits of PSR 317 to logic 1. In this case, two or more the pulse width controlling data are stored in the corresponding two or more ones of COMPRO to COMPR3.

What is claimed is:

1. A data processing apparatus comprising:
a program memory storing a program to be executed;
a data memory temporarily storing data;
a central processing unit interconnected to said program memory and said data memory through a bus and including a program counter for designating an address of said program memory in which an instruction to be executed is stored, an execution unit for executing the instruction read out from said program memory, and a program status word register for storing an execution condition of said execution unit; and
a pulse producing unit interconnected to said central processing unit through said bus and including a plurality of output terminals, a port selection register for temporarily storing port selection data for designating at least one of said output terminals, means for generating a pulse start timing signal, means responsive to said pulse start timing signal for bringing a selected one of the output terminals, which is designated by said port selection data, into one of two bistable logic level states, a counter counting a clock pulse signal, a plurality of compare registers and corresponding time data receiving means, each compare register comparing the count value of said counter with time data temporarily stored therein and bringing said selected output terminal into the other of said bistable logic level states when the count value of said counter reaches said time data, and means responsive to said pulse start timing signal for sending a signal requesting a macro service operation to said central processing unit;
said central processing unit further including means responsive to the request of said macro service operation for suspending the program being executed, and means for performing said macro service operation, without saving the contents of said program counter and said program status word register into said data memory and while holding the contents thereof as they are, said macro service operation performing means including means for storing said time data into said compare register which corresponds to said selected output terminal designated by said port selection data, means for updating said port selection data to designate at least another one of said output terminals, and means for allowing said program counter and said program status word register to change to resume the suspended program execution.

2. The data processing apparatus as claimed in claim 1, wherein said pulse producing unit further includes a capture register for fetching the count value of said counter in response to said pulse start timing signal and said macro service operation performing means further includes means for adding the content of said capture register to pulse width control data to produce said time data, said pulse width control data corresponding to a time period of the designated output terminal between said one logic level state and said other logic level state.

3. The data processing apparatus as claimed in claim 1, wherein said pulse start timing signal generating means includes an additional counter counting an additional clock pulse signal, and an additional compare register having start timing data receiving means, and comparing the count value of said additional counter with start timing data temporarily stored therein and generating said pulse start timing signal when the count value of said additional counter reaches said start timing data.

4. The data processing apparatus as claimed in claim 3, when said start timing data is stored into said additional compare register by said central processing unit.

5. The data processing apparatus as claimed in claim 1, wherein said pulse start timing signal generating means includes an additional compare register having start timing data receiving means and comparing the count value of said counter with start timing data temporarily stored therein and generating said pulse start timing signal when the count value of said counter reaches said start timing data.

6. The data processing apparatus as claimed in claim 5, wherein said start timing data is stored into said additional compare register by said central processing unit.

7. The data processing apparatus as claimed in claim 5, wherein said macro service operation performing means further includes means for adding said start timing data of said additional compare register to pulse width control data to produce said time data, said pulse width control data corresponding to a time period of the designated output terminal between said one logic level state and said other logic level state.

8. A data processing apparatus for a fuel injection device of an engine unit, comprising:
a pulse producing unit including a plurality of output terminals and means for coupling said output terminals to said fuel injection device, an input terminal having means for receiving a pulse request signal from said engine unit, a selection register temporarily storing selection data designating at least one of said output terminals, start timing signal generator means temporarily storing first time data and generating a pulse start timing signal when a time represented by said first time data elapses from the time of the application of said pulse request signal, means responsive to said pulse start timing signal for bringing the at least one designated output terminal, which is designated by said selection data, to a first logic level, a counter counting a clock pulse, a plurality of compare registers having second time data receiving means and each comparing the count value of said counter with second time data temporarily stored therein and generating a coincident output when the count value of said counter is coincident with said second time data, and means responsive to said coincident output for bringing the at least one designated output terminal to a second logic level;
a program memory storing a program to be executed;
a data memory temporarily storing data; and
a central processing unit coupled to said pulse producing unit, said program memory and said data memory, said central processing unit including a program counter for designating an address of said program memory in which an instruction to be executed is stored, an execution unit executing the instruction from said program memory, and a program status word register storing program state information;
said central processing unit further including means responsive to said pulse request signal for producing said first time data in response to data stored in said data memory and storing said first time data into said start timing signal generator means, and means responsive to said pulse start timing signal for suspending the program execution and performing a macro service operation without saving the contents of said program counter and program status word register into said data memory, while holding the contents thereof as they are, said macro service operation performing means including means for producing said second time data in response to data stored in said data memory, means for storing said second time data into the compare register corresponding to the output terminal designated by said selection data, means for updating said selection data to designate at least another one of said output terminals, and means for resuming the suspended program executed by allowing said program counter and program status word register to change.

9. The data processing apparatus as claimed in claim 8, wherein said start timing signal generator means includes an additional counter counting an additional clock pulse signal and an additional compare register having means for storing said first time data, and comparing the count value of said additional counter with said first time data, to generate said pulse start timing signal when the count value of said additional counter is coincident with said first time data.

10. The data processing apparatus as claimed in claim 8, wherein said start timing signal generator means includes an additional compare register having means for storing said first time data, and comparing the count value of said counter with said first time data, to generate said pulse start timing signal when the count value of said counter is coincident with said first time data.

* * * * *